US012756629B2

(12) United States Patent
Wang et al.

(10) Patent No.: US 12,756,629 B2
(45) Date of Patent: Oct. 6, 2026

(54) AUTHORIZING FEDERATED LEARNING PARTICIPANT IN 5G SYSTEM (5GS)

(71) Applicant: Telefonaktiebolaget LM Ericsson (publ), Stockholm (SE)

(72) Inventors: Cheng Wang, Shanghai (CN); Ferhat Karakoc, Istanbul (TR); Dan Xu, Gothenburg (SE); Jing Yue, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/106,402

(22) PCT Filed: Nov. 7, 2023

(86) PCT No.: PCT/EP2023/080986
§ 371 (c)(1),
(2) Date: Feb. 25, 2025

(87) PCT Pub. No.: WO2024/100035
PCT Pub. Date: May 16, 2024

(65) Prior Publication Data
US 2026/0156036 A1 Jun. 4, 2026

(51) Int. Cl.
*H04L 29/06* (2006.01)
*H04L 9/40* (2022.01)
(Continued)

(52) U.S. Cl.
CPC ...... *H04L 41/0895* (2022.05); *H04L 41/0893* (2013.01); *H04L 41/16* (2013.01); *H04L 63/083* (2013.01)

(58) Field of Classification Search
CPC . H04L 41/0895; H04L 41/0893; H04L 41/16; H04L 63/083; H04L 63/104; H04W 4/08; G06N 20/00
See application file for complete search history.

(56) References Cited

U.S. PATENT DOCUMENTS 11,483,218 B2 10/2022 Al-Dulaimi et al.
12,538,127 B2 1/2026 Khare et al.
(Continued)

FOREIGN PATENT DOCUMENTS

WO 2021179176 A1 9/2021

OTHER PUBLICATIONS

"3GPP TR 23.700-80 V1.1.0", 3rd Generation Partnership Project; Technical Specification Group Services and System Aspects; Study on 5G System Support for AI/ML-based Services (Release 18), Oct. 2022, pp. 1-213.
(Continued)

*Primary Examiner* — William A Corum, Jr.
(74) *Attorney, Agent, or Firm* — Murphy, Bilak & Homiller, PLLC

(57) ABSTRACT

Embodiments include methods for a first network function, NF, configured to operate as a server of a federated learning, FL, group in a communication network. Such methods include registering the following information in a network repository function, NRF, of the communication network: a vendor ID associated with the first NF, and an interoperability ID that corresponds to one or more vendor IDs associated with further NFs authorized to join the FL group as clients. Such methods include receiving an indication of a second NF, of the communication network, that is a candidate client for the FL group, and creating or updating the FL group including the second NF as a client, based on one of the following: a first token indicating that the first NF is authorized to add the second NF to the FL group as a client; or a second token indicating that the second NF is authorized to join the FL group as a client.

24 Claims, 11 Drawing Sheets

(51) Int. Cl.
*H04L 41/0893* (2022.01)
*H04L 41/0895* (2022.01)
*H04L 41/16* (2022.01)

(56) References Cited

U.S. PATENT DOCUMENTS

| | | | | |
|---|---|---|---|---|
| 2015/0180730 | A1 | 6/2015 | Felstaine et al. | |
| 2020/0120022 | A1 | 4/2020 | Stammers et al. | |
| 2021/0067339 | A1 | 3/2021 | Schiatti et al. | |
| 2021/0099462 | A1 | 4/2021 | Curtis et al. | |
| 2022/0104162 | A1 | 3/2022 | Aggarwal et al. | |
| 2022/0108214 | A1 | 4/2022 | Lee et al. | |
| 2022/0232386 | A1 | 7/2022 | Sehrawat et al. | |
| 2022/0248220 | A1 | 8/2022 | Mc Daid et al. | |
| 2022/0294706 | A1 | 9/2022 | Norrman et al. | |
| 2023/0146099 | A1* | 5/2023 | Ouyang | H04L 41/16 709/223 |
| 2023/0254719 | A1* | 8/2023 | Kim | H04L 41/16 370/252 |
| 2023/0308903 | A1 | 9/2023 | Kim et al. | |
| 2023/0345297 | A1 | 10/2023 | Karampatsis et al. | |
| 2024/0023082 | A1 | 1/2024 | Mu et al. | |
| 2024/0078457 | A1 | 3/2024 | Stockert et al. | |
| 2024/0298194 | A1 | 9/2024 | Mueck et al. | |
| 2024/0396811 | A1* | 11/2024 | Duan | H04L 41/16 |
| 2025/0106658 | A1* | 3/2025 | Olvera-Hernandez | H04W 24/08 |
| 2025/0139509 | A1 | 5/2025 | Subramanya et al. | |
| 2025/0274350 | A1* | 8/2025 | Kim | H04L 67/535 |
| 2026/0075060 | A1* | 3/2026 | Wang | H04L 63/104 |

OTHER PUBLICATIONS

"3GPP TR 23.700-81 V1.0.0", 3rd Generation Partnership Project; Technical Specification Group Services and System Aspects; Study of Enablers for Network Automation for 5G 5G System (5GS); Phase 3 (Release 18), Sep. 2022, pp. 1-257.

"3GPP TR 23.700-81 V1.1.0", 3rd Generation Partnership Project; Technical Specification Group Services and System Aspects; Study of Enablers for Network Automation for 5G 5G System (5GS); Phase 3 (Release 18), Oct. 2022, pp. 1-276.

"3GPP TR 33.738 V0.2.0", 3rd Generation Partnership Project; Technical Specification Group Services and System Aspects; Study on security aspects of enablers for Network Automation for 5G—phase 3;(Release 18), Jul. 2022, pp. 1-27.

"3GPP TR 33.738 V0.3.0", 3rd Generation Partnership Project; Technical Specification Group Services and System Aspects; Study on security aspects of enablers for Network Automation for 5G—phase 3; (Release 18), Oct. 2022, pp. 1-34.

"3GPP TS 23.288 V17.2.0", 3rd Generation Partnership Project; Technical Specification Group Services and System Aspects; Architecture enhancements for 5G System (5GS) to support network data analytics services (Release 17), Sep. 2021, pp. 1-196.

"ETSI TS 133 501 V17.11.1", 5G; Security architecture and procedures for 5G System (3GPP TS 33.501 version 17.11.1 Release 17), Oct. 2023, pp. 1-297.

"ETSI TS 133 501 V17.7.0", 5G; Security architecture and procedures for 5G System (3GPP TS 33.501 version 17.7.0 Release 17), Sep. 2022, pp. 1-296.

"New solution for KI#2 to support authorization of participant NWDAFs in FL", 3GPP TSG-SA3 Meeting #109, S3-223687, Toulouse, France, Nov. 14-18, 2022, pp. 1-4.

"3rd Generation Partnership Project; Technical Specification Group Services and System Aspects; Study on enablers for network automation for the 5G System (5GS); Phase 2 (Release 17)", 3GPP TR 23.700-91 V17.0.0, Dec. 2020, pp. 1-382.

* cited by examiner

AUTHORIZING FEDERATED LEARNING PARTICIPANT IN 5G SYSTEM (5GS)

TECHNICAL FIELD

The present application relates generally to the field of communication networks, and more specifically to techniques for securing artificial intelligence/machine learning (AI/ML) models used to generate analytics in a communication network (e.g., a 5G core network).

BACKGROUND

Currently the fifth generation (5G) of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces (NG) 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one or more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. i The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-containment of NFs, which can enable network deployments to take advantage of the latest virtualization and software technologies.

A 5GC NF, that is of particular interest in the present disclosure, is the Network Data Analytics Function (NWDAF). This NF provides network analytics information (e.g., statistical information of past events and/or predictive information) to other NFs on a network slice instance level. The NWDAF can collect data from any 5GC NF. Note that a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice.

Machine learning (ML) is a type of artificial intelligence (AI) that focuses on the use of data and algorithms to imitate the way that humans learn, gradually improving accuracy as more data becomes available. ML algorithms build models based on sample (or "training") data, with the models being used subsequently to make predictions or decisions. ML algorithms can be used in a wide variety of applications (e.g., medicine, email filtering, speech recognition, etc.) in which it is difficult or unfeasible to develop conventional algorithms to perform the needed tasks. A subset of ML is closely related to computational statistics.

Traditionally, AI models were on cloud-based servers that also stored the training data. In contrast, federated learning (FL, also known as collaborative learning) trains an ML model across multiple decentralized edge devices holding local data samples, without exchanging the training data among the devices. The edge devices (e.g., clients) train their respective copies of the model using their own local data, and then send parameters/weights from their locally trained models to a master device (e.g., server) that aggregates the parameters and updates the global ML model.

The 5G system architecture allows any NF to obtain analytics from an NWDAF using a Data Collection Coordination Function (DCCF) and associated Ndccf services. The NWDAF can also store and retrieve analytics information from an Analytics Data Repository Function (ADRF). 3GPP TS 23.288 (v17.2.0) specifies that NWDAF is the main NF for computing analytics based on ML models, and classifies NWDAF into two sub-functions (or logical functions): Analytics Logical Function (AnLF), which performs analytics procedures; and Model Training Logical Function (MTLF), which performs training and retraining of ML models used by the AnLF.

3GPP TR 23.700-81 (v1.0.0) specifies that support for FL in 5GC is a key issue to be further studied in 3GPP. This document identifies that ML model security is an important requirement for supporting FL in 5GC, particularly among the respective NWDAF (MTLF) that will be operating as the FL clients and server. In particular, the interim ML models trained by the FL clients and the final ML model derived by the FL server are important intellectual property of their owners and should be treated as such in 5GC.

Thus, it is very important that NWDAFs are authorized to participate in their respective FL roles. However current authorization capabilities in 3GPP SBA framework are insufficiently granular to provide this needed level of security.

SUMMARY

Embodiments of the present disclosure address these and other problems, issues, and/or difficulties, thereby facilitating the otherwise-advantageous deployment of federated learning for network analytics.

Some embodiments of the present disclosure include methods (e.g., procedures) for a first NF configured to operate as a server of a FL group in a communication network (e.g., 5GC).

These exemplary methods can include registering the following information in a network repository function (NRF) of the communication network: a vendor identifier (ID) associated with the first NF, and an interoperability ID that corresponds to one or more vendor IDs associated with further NFs authorized to join the FL group as clients. These exemplary methods can also include receiving an indication of a second NF, of the communication network, that is a candidate client for the FL group. These exemplary methods can also include creating or updating the FL group to include the second NF as a client, based on one of the following:

- a first token indicating that the first NF is authorized to add the second NF to the FL group as a client; or
- a second token indicating that the second NF is authorized to join the FL group as a client.

In some embodiments, the registered information also includes an analytics ID associated with a ML model used for FL, and the interoperability ID indicates authorization specific to the analytics ID.

In some embodiments, creating or updating the FL group including the second NF as a client can includes the following operations:

- obtaining the first token from the NRF in response to the indication;
- sending, to the second NF, a first request for the second NF to join the FL group as a client, wherein the first request includes the first token; and
- receiving from the second NF a first response indicating that the second NF will join the FL group as a client.

In some of these embodiments, the indication of the second NF that is a candidate client is received from the NRF as one of the following: a response to a client discovery request by the first NF, or a notification responsive to a subscription request by the first NF to registering of information in the NRF by candidate clients for the FL group.

In some of these embodiments, the indication of the second NF that is a candidate client is based on one or more of the following that was registered in the NRF by the second NF: an interoperability ID that corresponds to one or more vendor IDs associated with further NFs authorized to add the second NF to an FL group as a client, and an analytics ID associated with a ML model used for FL.

In other embodiments, the indication of the second NF that is a candidate client is an FL join request message that is received from the second NF and that includes the second token. In such case, creating or updating the FL group including the second NF as a client includes verifying the second token received from the second NF.

In some embodiments, the first NF is an NWDAF and/or the second NF is an NWDAF.

Other embodiments include exemplary methods (e.g., procedures) for a second NF configured to operate as a client of a FL group in a communication network (e.g., 5GC).

These exemplary methods can include registering the following information in a NRF of the communication network: a vendor ID associated with the second NF, and an interoperability ID that corresponds to one or more vendor IDs associated with further NFs authorized to add the second NF to an FL group as a client. These exemplary methods can also include subsequently joining an FL group as a client. A first NF is configured to operate as server for the FL group, and joining the FL group is based on one of the following:

- a first token indicating that the first NF is authorized to add the second NF to the FL group as a client; or
- a second token indicating that the second NF is authorized to join the FL group as a client.

In some embodiments, the registered information also includes an analytics ID associated with a ML model used for FL, and the interoperability ID indicates authorization specific to the analytics ID.

In some embodiments, joining the FL group as a client includes the following operations:

- receiving, from the first NF, a first request for the second NF to join the FL group as a client, wherein the first request includes the first token;
- verifying the first token received from the first NF; and
- based on the verifying, sending to the first NF a first response indicating that the second NF will join the FL group as a client.

In other embodiments, joining the FL group as a client includes the following operations:

- discovering, via the NRF, the FL group and the first NF as server of the FL group;
- sending to the first NF a second request to join the FL group as a client, wherein the second request includes the second token; and
- receiving from the first NF a second response indicating that the first NF accepted the second request.

In some of these embodiments, joining the FL group as a client can also include obtaining the second token from the NRF in response to discovering the FL group and the first NF as server of the FL group. The obtained second token is sent to the first NF with the second request.

Other embodiments include methods (e.g., procedures) for an NRF of a communication network (e.g., 5GC).

These exemplary methods can include the following information associated with first and second NFs of the communication network:

- a first vendor ID associated with the first NF configured to operate as a server for a FL group,
- a first interoperability ID that corresponds to one or more vendor IDs associated with further NFs authorized to join the FL group as clients,
- a second vendor ID associated with a second NF configured to operate as a FL client, and
- a second interoperability ID that corresponds to one or more vendor IDs associated with further NFs authorized to add the second NF to an FL group as a client.

These exemplary methods can also include, based on the registered information, providing one or more of the following:

- to the first NF, a first token indicating that the first NF is authorized to add the second NF to the FL group as a client; or
- to the second NF, a second token indicating that the second NF is authorized to join the FL group as a client.

In some embodiments, the registered information also includes one or more of the following:

- a first analytics ID associated with a ML model used for FL by the first NF;
- a second analytics ID associated with a ML model used for FL by the second NF;
- an indication of one or more first FL capabilities associated with the first NF; and
- an indication of one or more second FL capabilities associated with the second NF.

In some embodiments, these exemplary methods can also include discovering the second NF based on one or more of the following matches or correspondences:

- a match between the second vendor ID and one of the vendor IDs that correspond to the first interoperability ID,
- a match between the first analytics ID and the second analytics ID, and
- a match or correspondence between the first capabilities and the second capabilities.

In such embodiments, these exemplary methods can also include sending to the first NF an indication that the second NF is a candidate client for the FL group.

In some of these embodiments, discovering the second NF and sending the indication are responsive to one of the following: a client discovery request by the first NF, or a subscription request by the first NF to registering of information in the NRF by candidate clients for the FL group.

In other embodiments, these exemplary methods can also include discovering the first NF based on one or more of the following matches or correspondences:

- a match between the first vendor ID and one of the vendor IDs that correspond to the second interoperability ID,
- a match between the first analytics ID and the second analytics ID, and
- a match or correspondence between the first capabilities and the second capabilities.

In such embodiments, these exemplary methods can also include sending to the second NF an indication of the FL group and that the first NF is server for the FL group.

In some of these embodiments, discovering the first NF and sending the indication are responsive to one of the following: the registering of the information associated with the second NF, or a server discovery request by the second NF.

Other embodiments include NFs (e.g., NWDAFs, NRFs) or network nodes hosting such NFs that are configured to perform the operations corresponding to any of the exemplary methods described herein. Other embodiments also include non-transitory, computer-readable media storing computer-executable instructions that, when executed by processing circuitry, configure such NFs or network nodes to perform operations corresponding to any of the exemplary methods described herein.

These and other disclosed embodiments can prevent an unauthorized NF (e.g., NWDAF) from joining a FL group as a client and/or prevent a NF from joining a group as a client for FL operations that are fraudulent and/or non-authentic. In this manner, embodiments can prevent exposure of confidential and/or sensitive ML models to unauthorized parties during FL, and can prevent security risks to NFs that can participate in FL. By improving security, embodiments facilitate deployment of FL in a multi-vendor communication network, such as 5GC.

These and other objects, features, and advantages of the present disclosure will become apparent upon reading the following Detailed Description in view of the Drawings briefly described below.

DETAILED DESCRIPTION

Figure 1:
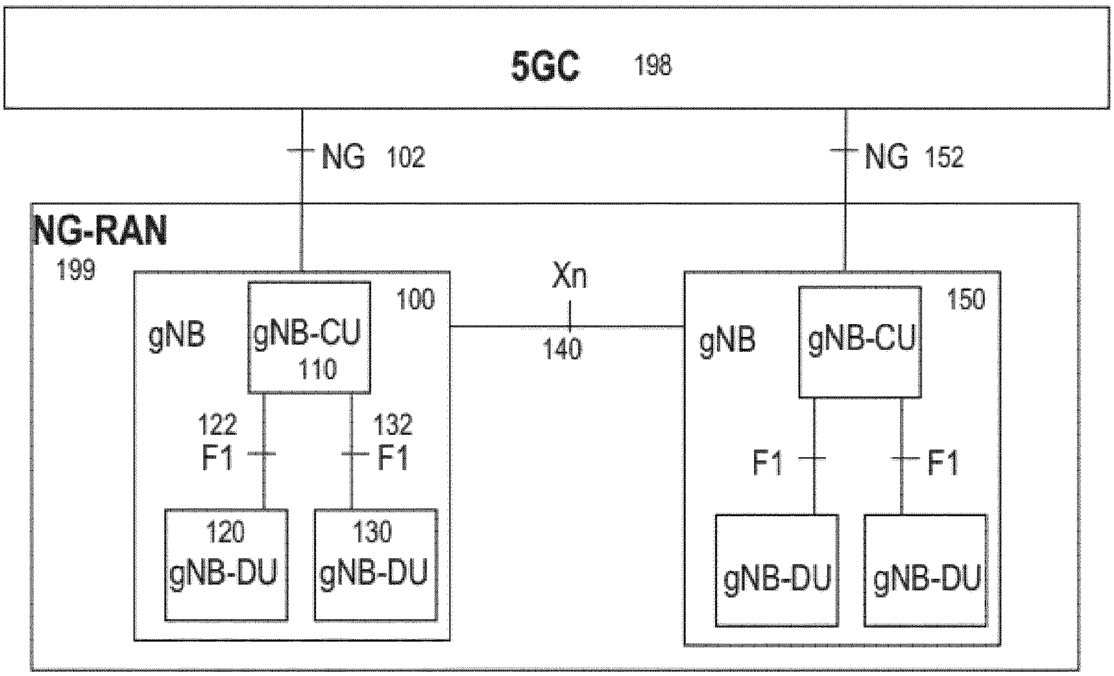
FIGS. 1-2 illustrate various aspects of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step explicitly described as following or preceding another step and/or where it is implicit that a step must follow or precede another step. Any feature of any of the embodiments disclosed herein can applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (SMF), a user plane function (UPF), a Service Capability Exposure Function (SCEF), or the like.

Wireless Device: As used herein, a "wireless device" (or "WD" for short) is any type of device that is capable, configured, arranged and/or operable to communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with the term "user equipment" (or "UE" for short), with both of these terms having a different meaning than the term "network node".

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without prefix) can be any type of node that can in or with a wireless network (including RAN and/or core network), including a radio access node (or equivalent term), core network node, or wireless device. However, the term "node" may be limited to a particular type (e.g., radio access node) based on its specific characteristics in any given context.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

Figure 2:
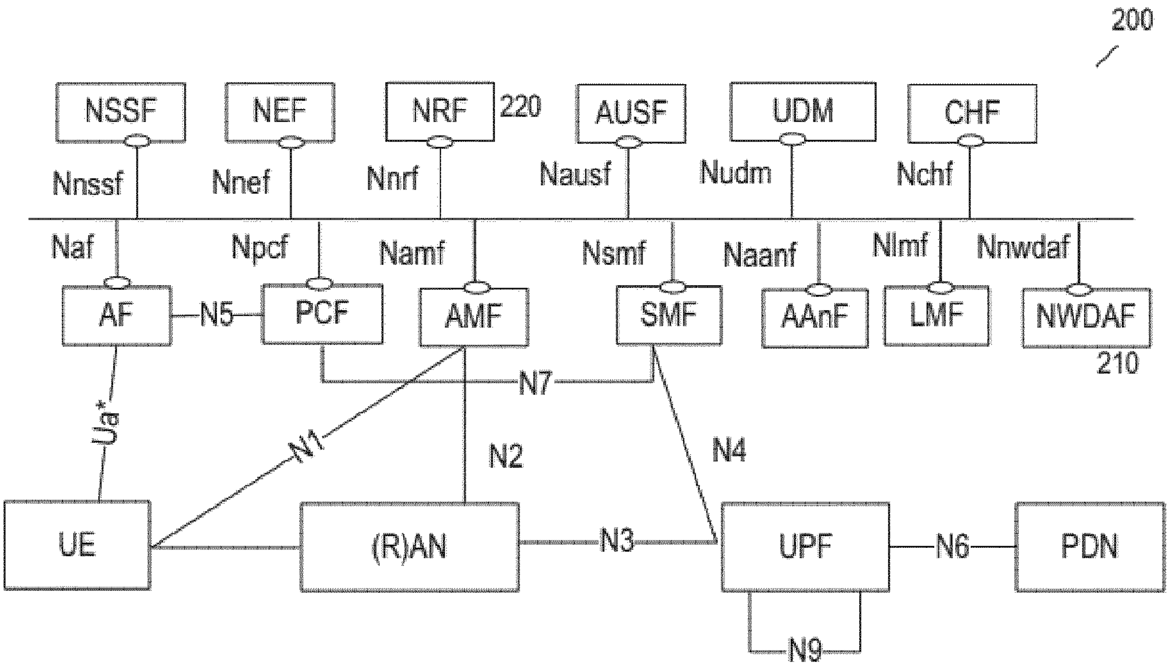

FIG. 2 shows an exemplary non-roaming reference architecture for a 5GC (200), with service-based interfaces and various 3GPP-defined NFs within the Control Plane (CP). These include the following:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF, 220) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF, 210) with Nnwdaf interface, described in more detail above and below.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

3GPP Rel-17 enhances the SBA by adding a Data Management Framework that includes a Data Collection Coordination Function (DCCF) and a Messaging Framework Adaptor Function (MFAF), which are defined in detail in 3GPP TR 23.700-91 (v17.0.0). The Data Management Framework is backward compatible with a Rel-16 NWDAF function, described above. For Rel-17, the baseline for services offered by the DCCF (e.g., to an NWDAF) are the Rel-16 NF Services used to obtain data. For example, the baseline for the DCCF service used by an NWDAF consumer to obtain UE mobility data is Namf_EventExposure.

As briefly mentioned above, machine learning (ML) is a type of artificial intelligence (AI) that focuses on the use of data and algorithms to imitate the way that humans learn, gradually improving accuracy as more data becomes available. ML algorithms build models based on sample (or "training") data, with the models being used subsequently to make predictions or decisions. ML models can be used in a wide variety of applications (e.g., medicine, email filtering, speech recognition, etc.) in which it is difficult or unfeasible to develop conventional algorithms to perform the needed tasks.

3GPP TS 23.288 (v17.2.0) specifies that NWDAF is the main NF for computing analytics based on ML models and classifies NWDAF into two sub-functions (or logical functions): Analytics Logical Function (AnLF), which performs analytics procedures; and Model Training Logical Function (MTLF), which performs training and retraining of ML models used by the AnLF. In the following, the terms "AnLF", "NWDAF AnLF", and "NWDAF (AnLF)" will be used interchangeably. Likewise, the terms "MTLF", "NWDAF MTLF", and "NWDAF (MTLF)" will be used interchangeably.

3GPP TS 23.288 (v17.2.0) specifies a subscribe/notify procedure for a consumer NF to retrieve ML model(s) associated with one or more Analytics IDs whenever a new ML model has been trained by the NWDAF MTLF and becomes available. This is referred to as ML Model Provisioning and is implemented by the Nnwdaf_MLModelProvision service.

Traditionally, ML models were trained on cloud-based servers that also stored the training data. In contrast, federated learning (FL, also known as collaborative learning) trains an ML model across multiple decentralized edge devices holding local data samples, without exchanging the training data among the devices. The edge devices (e.g., clients) train their respective copies of the model using their own local data, and then send parameters/weights from their locally trained models to a master device (e.g., server) that aggregates the parameters and updates the global ML model.

3GPP TR 23.700-81 (v1.0.0) specifies that support for FL in 5GC is a key issue to be further studied in 3GPP. This document identifies that ML model security is an important requirement for supporting FL in 5GC, particularly among the respective NWDAF (MTLF) that will be operating as FL clients and server. The following text from 3GPP TR 23.700-81 (v1.0.0) describes various aspects of this key issue to be studied.

*Begin 3GPP Text*

5.8.1 Description

This contribution is related to WT #4.1.

Current enablers for network automation architecture by NWDAF still faces some major challenges as follows:

- User data privacy and security (protected by e.g., GDPR) has become a worldwide issue, it is also difficult for NWDAF to collect UE level network data.
- With the introduction of MTLF in Rel-17, various data from wide area is needed to train an ML model for NWDAF containing MTLF. However, it is difficult for NWDAF containing MTLF to collect all the raw data from distributed data source in different areas.

In order to address the challenges, 3GPP tries to adopt Federated Learning (also called Federated Machine Learning) technique in NWDAF containing MTLF to train an ML model, in which there is no need for raw data transferring (e.g., centralized into NWDAF) but only need for cooperation among multiple NWDAFs (MTLF) i.e., sharing of ML model and of the learning results among multiple NWDAFs (MTLF). In Rel-17, however, the cooperation of multiple NWDAF containing MTLF is explicitly prohibited and it is only allowed for NWDAF containing AnLF to subscribe or request the ML model from the configured NWDAF containing MTLF This Key Issue is aim to study architecture enhancement to support Federated Learning which allows the cooperation of multiple NWDAF containing MTLF to train an ML model in 3GPP network with the following aspects:

- Identify the use cases that required Federated learning in 5GC;
- Study the registration and discovery of the NWDAF supporting Federated Learning;
- Study how to decide whether Federated Learning is required or not for an existing Analytics ID or a new Analytics ID;
- Study how to coordinate multiple NWDAFs including selection of participant NWDAF instances in the Federated Learning group, e.g., assistance information (if any) to perform the selection, and decision of role for the participant NWDAF;
- Study whether and how to perform performance (e.g., network performance and model performance) monitoring of the NWDAF Federated Learning operation.

NOTE 1: Performance monitoring of Federated Learning operation should be aligned with mechanisms for improved correctness of analytics defined in WT #1.2.

NOTE 2: In terms of user data privacy and security improvement, the cooperation with SA3 is needed.

NOTE 3: The impact on UE and RAN shall be avoided for this Key Issue.

NOTE 4: Solutions requiring model distribution for FL should be aligned with mechanism for model sharing defined in WT #3.2.

NOTE 5: Server NWDAF connects to one layer of Client NWDAFs, and any of the Client NWDAFs cannot cascade more sublayers.

NOTE 6: All the NWDAFs attending the Federated Learning should belong to the same PLMN.

*End 3GPP Text*

Some candidate solutions for participant NWDAF discovery and selection are described in 3GPP TR 23.700-81 (v1.0.0). One of these solutions ("solution #51") is described in the following text from 3GPP TR 23.700-81 (v1.0.0):

*Begin 3GPP Text*

6.51.1 Description

This solution is proposed to address Key Issue #8: Supporting Federated Learning in 5GC. The study bullets of this Key Issues include:

- Study how to coordinate multiple NWDAFs including selection of participant NWDAF instances in the Federated Learning group, e.g., assistance information (if any) to perform the selection, and decision of role for the participant NWDAF.
- Study whether and how to perform performance (e.g., network performance and model performance) monitoring of the NWDAF Federated Learning operation.

To address the challenges in the above bullets for supporting Federated Learning in 5GC, this solution focus on the NWDAF(s) selection in Federated Learning preparation phase, NWDAF(s) monitoring and maintenance in Federated Learning execution phase.

A lot of factors influence Client NWDAF(s) selection in Federated Learning preparation phase. For example, the capability of NWDAF(s), the interoperability and availability of Client NWDAF(s) to join in Federated Learning.

In Federated Learning execution phase, due to dynamic changes of federation network, current Client NWDAF(s) may leave or join, the dynamic joining and leaving of Client NWDAF(s) to a Federated Learning multi-round learning/training process in 5GC should be considered. In addition, methods may be applied for Server NWDAF to monitoring the status changes (e.g., changes of capabilities and availability) of Client NWDAF(s).

*End 3GPP Text*

Figure 3:
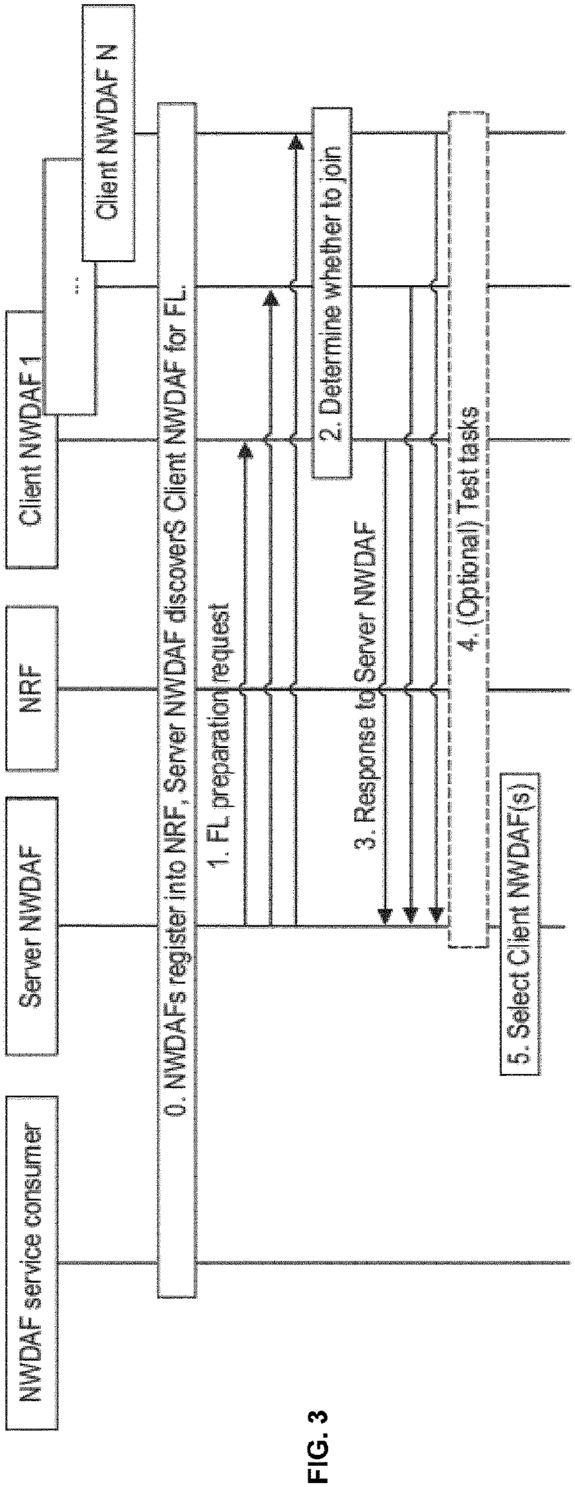
FIG. 3 shows a high-level diagram of a procedure for client NWDAF selection during FL preparation phase.

In FL preparation phase, server and (potential) client NWDAFs are discovered via NRF, and client NWDAF(s) are selected by the method for handshake pattern. The client NWDAF(s) selection is based on the availability, capability, etc. FIG. 3 shows a high-level diagram of a procedure for client NWDAF selection during FL preparation phase. Although the operations in FIG. 3 are given numerical labels, this is intended to facilitate the following description rather than to require or imply any specific operational order, unless expressly stated otherwise.

In operation 0, which can be considered preparatory, NWDAFs register into NRF with FL capability. Server NWDAF discovers Client NWDAFs based on, e.g., FL capability, Analytics ID, etc.

In operation 1, Server NWDAF sends FL preparation request to the Client NWDAF(s) by invoking an Nnwdaf_MLPreparation_Request service operation with interoperability information. Indication of role for NWDAF(s), i.e., as Client NWDAF(s), may be included in the preparation request. Note that the interoperability information indicates what abilities (e.g., able to run certain models) are needed for the client NWDAF to support this FL procedure, e.g., if the server NWDAF and the client NWDAF can share model and how to share model. The interoperability information is determined among different vendors and its content is not specified by 3GPP.

In operation 2, client NWDAF(s) determine whether to join the FL process based on their respective availabilities, capabilities, and interoperability information. In operation 3, one or more client NWDAFs respond to server NWDAF indicating that they want to join the FL procedure.

In operation 4, server NWDAF may send test tasks to client NWDAF(s) that want to join the FL procedure. Client NWDAF(s) run the test tasks and send the results to the Server NWDAF. Note that the test tasks may be micro computation or training tasks, such that the requirement for completing the micro tasks is the same as or is similar to requirements for the main tasks. For example, the test task could be a small task to let the client NWDAF collect local data and send the local model weights back to the server; or some test to make sure that the server and client NWDAF can communicate if they use the same FL framework or library. How to retrieve and run the test tasks is out of scope of 3GPP specifications.

In operation 5, server NWDAF selects client NWDAF(s) for FL, considering results of the test tasks as needed and/or desired.

Figure 4:
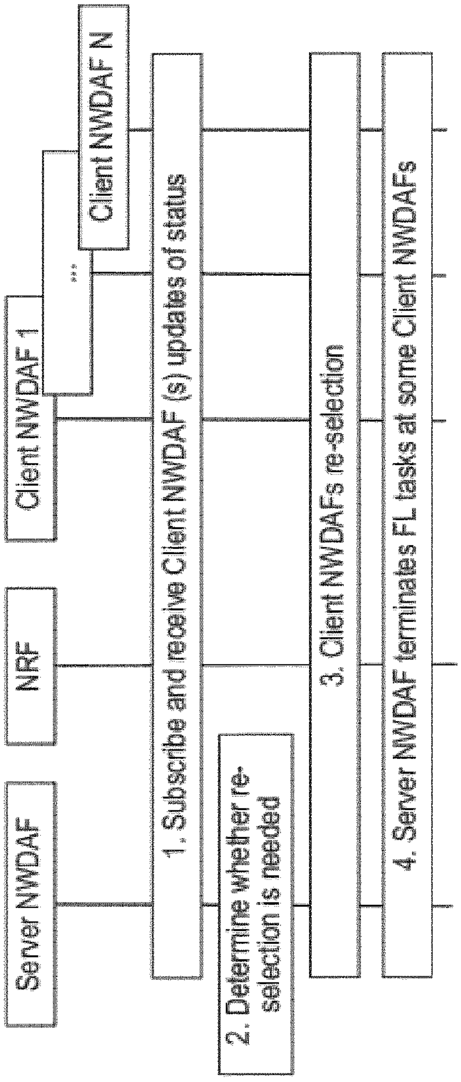
FIG. 4 shows a high-level diagram of a procedure for client NWDAF monitoring and re-selection during FL execution phase.

In FL execution phase, server NWDAF monitors the status changes of client NWDAF(s). Client NWDAF(s) may be re-selected based on the updated status, availability, and/or capability, etc. of the client NWDAF(s) for the FL tasks. FIG. 4 shows a high-level diagram of a procedure for NWDAF monitoring and re-selection during FL execution phase. Although the operations in FIG. 4 are given numerical labels, this is intended to facilitate the following description rather than to require or imply any specific operational order, unless expressly stated otherwise.

In operation 1, while monitoring the status of Client NWDAF(s) during the FL execution, Server NWDAF receives the updated status of the Client NWDAF(s). Server NWDAF may perform monitoring and obtain the updated status of Client NWDAF(s) directly and/or via NRF. For example, the status of client NWDAF could be NF load, NF availability, capability changes (e.g., no longer supports FL), etc.

In operation 2, server NWDAF checks client NWDAF(s) status based on the received information and determines whether re-selection of client NWDAF(s) for the next round(s) of FL is needed. The determination is based on the updated status of the client NWDAF(s), including the availability, capability, etc. If re-selection is determined to be needed, in operation 3 server NWDAF re-select Client NWDAF(s) according to operation 1-5 in FIG. 3. The procedure for discovery of new Client NWDAF(s) in FL execution phase is described below with reference to FIG. 5.

In operation 4, client NWDAF(s) terminate operations for the FL if it receives termination request from the Server NWDAF.

Figure 5:
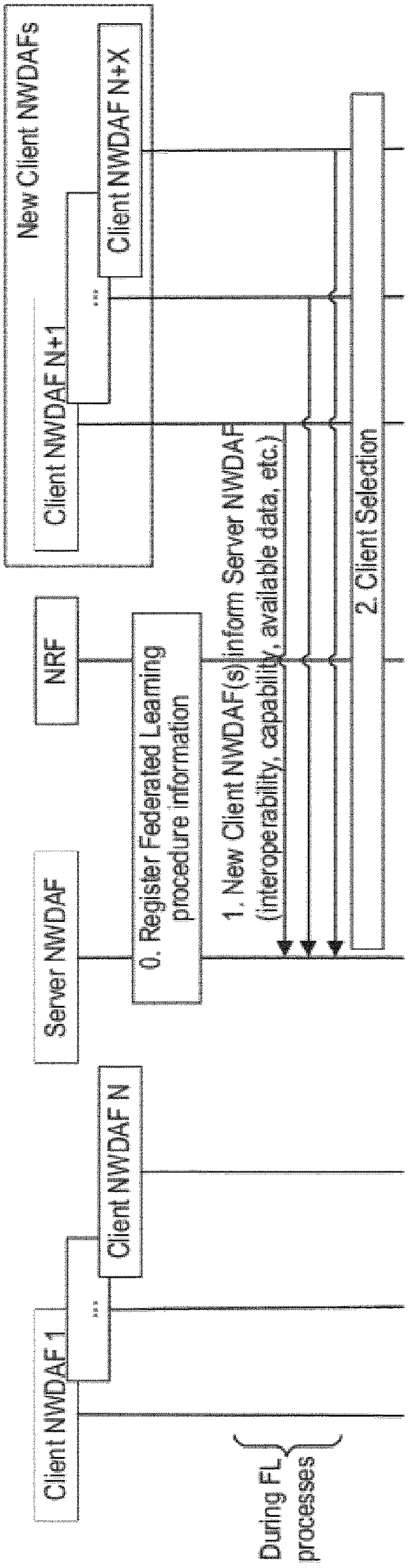
FIGS. 5-6 show high-level diagrams of two procedures for dynamic discovery and joining of new NWDAF(s) in FL execution phase.

There are two possible ways for server NWDAF to obtain information about new client NWDAF(s): directly from the new clients, or indirectly via NRF. FIG. 5 shows a high-level diagram of a procedure for dynamic discovery and joining of new NWDAF(s) in FL execution phase when a new client informs server NWDAF directly. Although the operations in FIG. 5 are given numerical labels, this is intended to facilitate the following description rather than to require or imply any specific operational order, unless expressly stated otherwise.

As a prerequisite, client NWDAFs 1−N are selected by the server NWDAF for participating in the current round of FL. New client NWDAFs N+(1−X) are available and/or have the capability to join in subsequent rounds of FL. These new client NWDAFs know the information about the Server NWDAF. In operation 0, server NWDAF registers into NRF about the FL procedure with the following parameters:

FL Correlation ID, used to identify a specific FL procedure. For example, a server NWDAF or a client NWDAF can be part of multiple FL procedures at the same time, so when they receive messages or data from other NWDAFs, they have to know the FL procedure associated with the message or data.

Analytics ID.

When a server NWDAF starts a FL procedure, it registers the FL procedure in the NRF with FL Correlation ID, Analytics ID. When later a client NWDAF wants to join a FL dynamically, e.g., it wants to update its local model using global information, it will query NRF if there is an ongoing FL for the analytics ID. Then NRF will provide the server NWDAF ID and FL Correlation ID to the client NWDAF, then the client NWDAF can contact the server NWDAF to join the FL procedure. With the FL correlation ID, the server NWDAF knows which FL procedure the client NWDAF wants to join and which model it should provide to the client.

In operation 1, if the information about the server NWDAF and the corresponding FL procedure is known via NRF, new client NWDAFs N+(1−X) inform server NWDAF by invoking an Nnwdaf_MLPreparation_Request service operation indicating their interoperability and availability information.

In operation 2, before starting next round of training, the server NWDAF selects client NWDAF(s) from NWDAFs 1−(N+X) based on the updated information of the client NWDAF(s). The procedure is performed according to operation 1-5 in FIG. 3.

Figure 6:
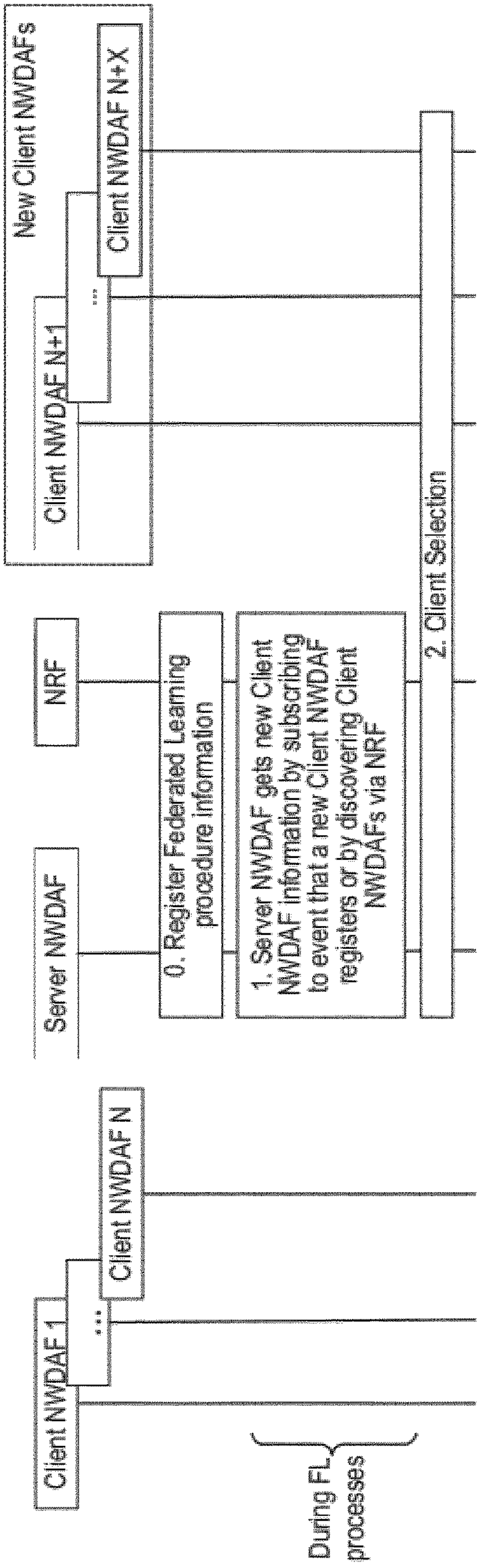

FIG. 6 shows a high-level diagram of a procedure for dynamic discovery and joining of new NWDAF(s) in FL execution phase when a server NWDAF obtains information about NWDAFs from NRF. Although the operations in FIG. 6 are given numerical labels, this is intended to facilitate the following description rather than to require or imply any specific operational order, unless expressly stated otherwise.

As a prerequisite, client NWDAFs 1−N are selected by the server NWDAF for participating in the current round of FL. New client NWDAFs N+(1−X) are available and/or have the capability to join in subsequent rounds of FL. Operation 0 is identical to FIG. 5 operation 0. In operation 1, server NWDAF obtains information about new Client NWDAF(s) dynamically via NRF, i.e., by subscribing to an event that a new Client NWDAF registers with NRF, or discovering new client NWDAFs via NRF when it needs to perform reselection of client NWDAFs. Operation 2 is identical to FIG. 5 operation 2.

Interim ML models trained by the FL clients and the final ML model derived by the FL server are important intellectual property of their owners and should be treated as such in 5GC. Thus, it is very important that NWDAFs are authorized to participate in their respective FL roles. For example, if a client NWDAF instance joins an unauthorized FL group, it may lead to the following security threats and/or issues:

Client NWDAF(MTLF)'s resource may be used up by being included into many unauthorized FL groups.

Sensitive data may be used to train unauthorized FL group's ML model.

Unauthorized FL group may utilize the local model received from the client NWDAF(MTLF) to infer sensitive training data details.

Similarly, If a client NWDAF joins an FL group without authorization by the server NWDAF, it may lead to the following security threats and/or issues:

Unauthorized client NWDAF may negatively affect FL group's generation of ML model.

Sensitive training data and FL group's ML model may be disclosed to the unauthorized client NWDAF.

Accordingly, it is necessary to selectively authorize participant NWDAF instances in an FL group. In particular, a client NWDAF should be able to authorize whether a server NWDAF can include it into an FL group, and server NWDAF should be able to authorize whether a client NWDAF can join an FL group. However, current authorization capabilities in 3GPP SBA framework only support authorization on an SBA service, resource, or operation level, which is insufficiently granular to ensure that server and client NWDAFs are authorized to participate in an FL procedure, and/or that an offered FL procedure is authentic and/or does not pose a security threat to a potential participant.

Embodiments of the present disclosure address these and other problems, issues, and/or difficulties by techniques whereby a server NWDAF provides an authorization profile for a specific FL group, which enables a token to be issued for the authorization profile, where the token authorizes the client NWDAF to join the FL group. Additionally, upon a request from a client NWDAF to join an FL group, the server NWDAF retrieves the NF profile of the client NWDAF from NRF, based on which the server NWDAF authorizes the client NWDAF joining the FL group. Furthermore, an NRF grants tokens used for joining FL groups based on interoperability of different vendors of server NWDAFs and client NWDAFs.

More specifically, it is expected that authorization of participant NWDAF may occur upon initial creation of an FL group or when the participant NWDAF joins an existing FL group and ongoing training procedure. For embodiments related to initial creation of the FL group, it is expected that the server NWDAF creates a FL group by discovering and selecting client NWDAFs via NRF. Based on trust between server NWDAF and NRF, the discovery of the client NWDAFs via NRF provides an implicit indication to the server NWDAF that the discovered client NWDAFs are authorized to participate the FL procedure. Likewise, server NWDAF acquires an SBA OAuth token to invoke a FL service request to the discovered client NWDAF, which authorizes the server NWDAF based on receiving the token with the FL service request.

During server NWDAF initiation of an FL procedure or reselection of FL clients involved in an ongoing FL procedure, the NRF verifies that the Server NWDAF's Vendor ID is included in (or corresponds to) a selected client NWDAF's interoperability ID for the Analytics ID associated with the FL procedure. If so, the NRF grants the token based the information provided in selected client NWDAF's NF profile.

For embodiments related to a new client NWDAF joining an existing/ongoing FL group, there are two variants. In one variant, the server NWDAF becomes aware of a new client NWDAF via NRF discovery or notification, and invites the new client NWDAF to join the FL group. The method for authorization of server/client participants is the same as the initial procedure.

In another variant, a client NWDAF detects an ongoing FL group and the associated server NWDAF (e.g. via NRF) and proactively sends a join request to the server NWDAF. The client NWDAF acquires an SBA Oauth token from NRF for joining the FL group, and includes the token in the join request. The NRF issues the token to the client NWDAF based on the FL group's authorization, which has been registered in NRF by the server NWDAF upon FL group creation. Based on the token received with the join request, the server NWDAF authorizes the client NWDAF to join the FL group. As an alternative, the server NWDAF retrieves the client NWDAF's NF profile from NRF and performs authorization based on that information.

The client NWDAF can authorize the server NWDAF in various ways. In some variants, the client NWDAF can authorize the server NWDAF implicitly based on sending a join response to the server NWDAF's join request. In other variants, the client NWDAF can include a token in the join request which is used by the server NWDAF in the following message inviting the client NDAF into the FL group. These variants can be similar to the embodiments related to initial creation of the FL group.

For case that a client NWDAF dynamically joins a FL group during FL execution phase, the NRF verifies that the client NWDAF's Vendor ID is included in the Server NWDAF's Interoperability ID for the Analytics ID associated with the FL procedure. If so, the NRF grants the token based the information stored in the server NWDAF's NF profile.

Embodiments of the present disclosure can provide various benefits and/or advantages. For example, embodiments can prevent an unauthorized NF (e.g., NWDAF) from joining a FL group as a client and/or prevent a NF from joining a group as a client for FL operations that are fraudulent and/or non-authentic. In this manner, embodiments can prevent exposure of confidential and/or sensitive ML models to unauthorized parties during FL, and can prevent security risks to NFs that are capable of participating in FL. Accordingly, embodiments improve the security of and thereby facilitate deployment of FL in a multi-vendor communication network, such as 5GC.

Figure 7:
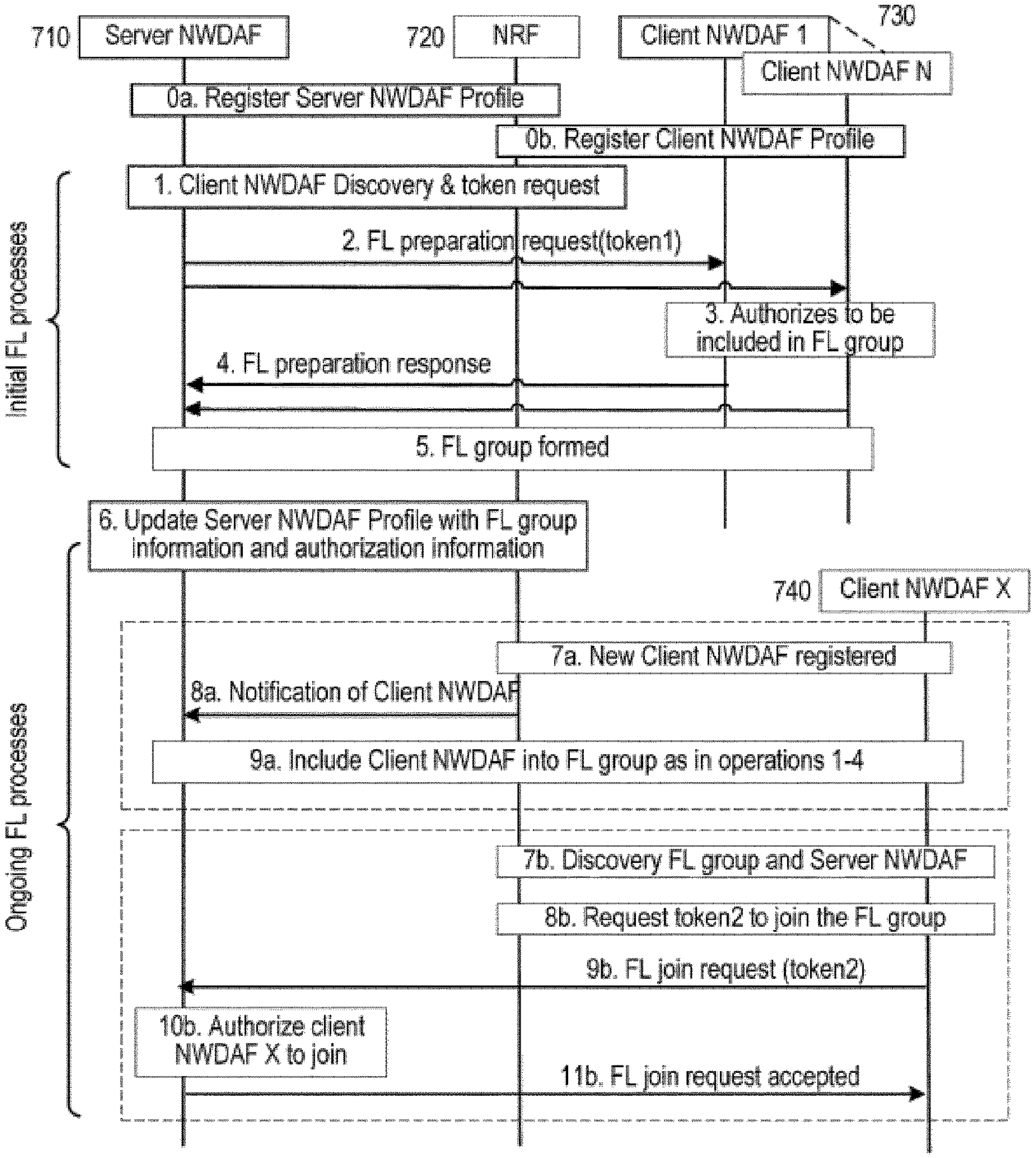
FIG. 7 shows a signaling diagram of a procedure involving a server NWDAF, an NRF, and various client NWDAFs, according to various embodiments of the present disclosure.

FIG. 7 shows a signaling diagram of a procedure involving a server NWDAF (710) an NRF (720), client NWDAFs 1–N (collectively 730), and a client NWDAF X (740), according to various embodiments of the present disclosure. Although the operations shown in FIG. 7 are given numerical labels, this is intended to facilitate explanation rather than to require or imply any specific operational order, unless stated otherwise below.

In operations 0*a*-*b*, server NWDAF and client NWDAFs 1–N register their respective NF profiles in NRF, including FL capability type (e.g., server and/or client), Vendor ID, Interoperability ID, Address Information, Service Area, Analytics ID(s), etc. For example, the Interoperability ID can indicate and/or be associated with a list of NWDAF vendors (e.g., Vendor IDs)) that are allowed to retrieve ML models from the registering NWDAF's MTLF.

In operation 1, server NWDAF discovers client NWDAFs 1-N via NRF based on FL selection criteria. For example, client NWDAF FL capability, Interoperability ID, Analytics ID(s), etc. match corresponding values for server NWDAF. Additionally, server NWDAF request tokens for each discovered client NWDAF from NRF, which verifies that the server NWDAF's Vendor ID is included in each discovered client NWDAF's Interoperability ID for the Analytics ID, i.e., based on the NF profile information registered by the respective client NWDAFs. The NRF generates tokens ("token1") for each discovered client NWDAF that is verified in this manner (e.g., client NWDAFs 1-N) and sends the generated tokens to the server NWDAF.

In operation 2, the server NWDAF sends FL preparation requests to the client NWDAFs 1-N by invoking an Nnwdaf_MLPreparation_Request service operation with the respective tokens granted by NRF. Indication of FL role for the recipient NWDAFs (i.e., as client NWDAF) may be included in the FL preparation request.

In operation 3, client NWDAFs 1-N verify that the server NWDAF is authorized to form the FL group based on the respective token and determines whether to join the FL group. This determination can be made, for example, based on their respective availabilities and capabilities. In operation 4, client NWDAFs 1-N respond to the server NWDAF indicating that they want to the join the FL group. In operation 5, the server NWDAF form an FL group from the client NWDAFs 1-N, based on the positive responses in operation 4.

In operation 6, the server NWDAF registers or updates its registration in NRF to include information about the formed FL group, including the following:

- FL Correlation ID or FL group ID, as described above in relation to FIG. 5;
- Analytics ID;
- Interoperability ID; and
- Authorization scope, including one or more of the following:
  - allowed requester NF type(s),
  - allowed requester NF ID(s), and
  - allowed requester FL capabilities (e.g., FL client).

In some embodiments, NRF may verify the authorization information being registered by server NWDAF is authentic, e.g., that FL group owner ID is correct and identical to the registering server NWDAF's ID.

Subsequently, new client NWDAF X joins the FL group according to different embodiments described below. In some embodiments, in operation 7*a*, new client NWDAF X registers with NRF in a similar manner as existing client NWDAFs 1-N in operation 0*b*. In operation 8*a*, the server NWDAF obtains information about new client NWDAF X via NRF, e.g., by subscribing to registration events by new client NWDAFs or by discovering the new client NWDAF via NRF when the server NWDAF determines a need to reselect one or more client NWDAFs. In operation 9*a*, the server NWDAF repeats operations 1-4 discussed above to include client NWDAF X in the FL group. In such case, NRF behaves as described in operation 1 above.

In other embodiments, in operation 7*b*, new client NWDAF X discovers the FL group and the corresponding server NWDAF via NRF. In operation 8*b*, client NWDAF X requests a token from NRF for joining the discovered FL group. In the request, client NWDAF X includes the associated Analytics ID as well as the client NWDAF's Vendor ID and FL capability information. Upon receipt, the NRF verifies that the client NWDAF's Vendor ID is included in the server NWDAF's Interoperability ID for the Analytics ID associated with the FL group, i.e., as registered in the server NWDAF's NF profile. The NRF generates the token ("token2") and sends it to the client NWDAF based on verifying in this manner.

In operation 9*b*, client NWDAF X sends an FL join request to the server NWDAF, including the obtained token2. In operation 10*b*, the server NWDAF determines whether the client NWDAF is authorized to join the ongoing FL group based on received token2. Based on a positive determination in operation 10*b*, the server NWDAF responds to new client NWDAF X in operation 11*b*, indicating that it accepted the FL join request from the client NWDAF.

Although embodiments have been described above in the specific context of an NWDAF arranged as client or server, skilled persons will understand that underlying principles of the above-described embodiments are equally applicable to other NFs, logical functions, nodes, etc. (e.g., with different names) that perform similar operations as these respective entities.

Figure 8:
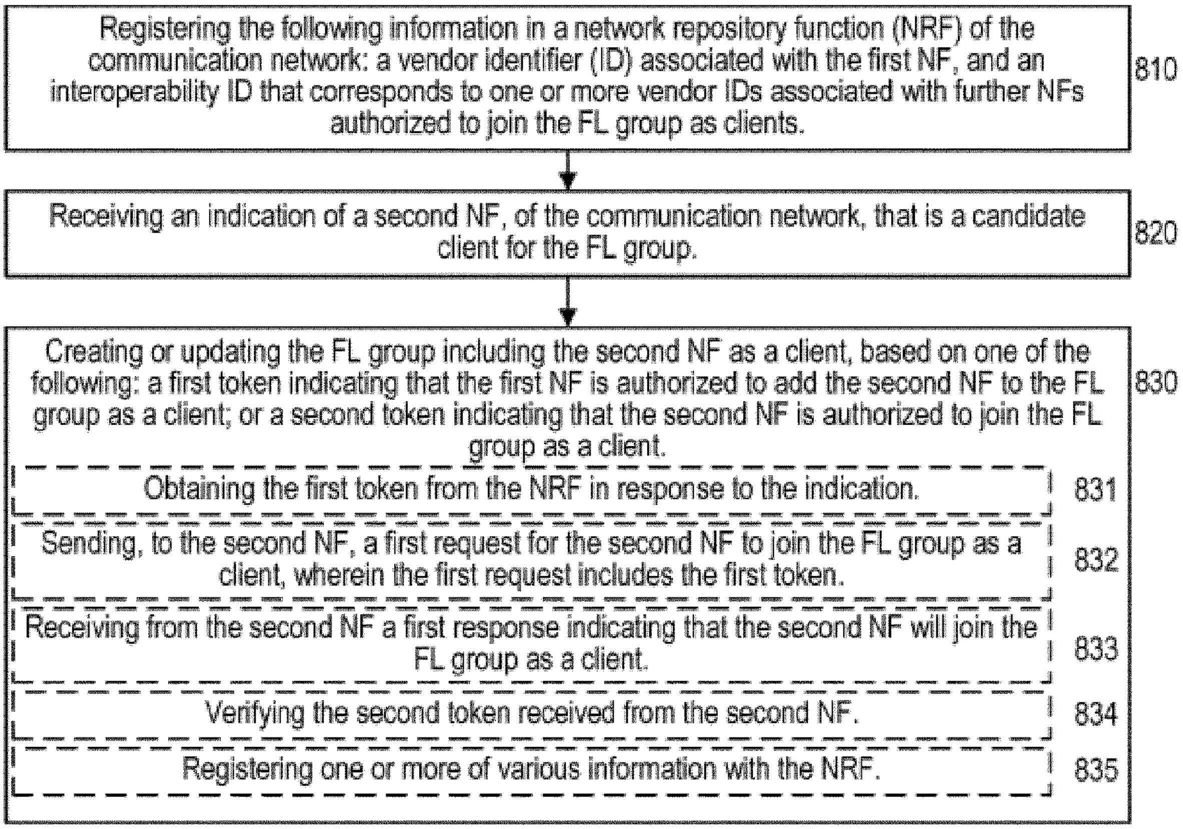
FIG. 8 shows an exemplary method (e.g., procedure) for a first NF of a communication network, according to various embodiments of the present disclosure.
Figure 9:
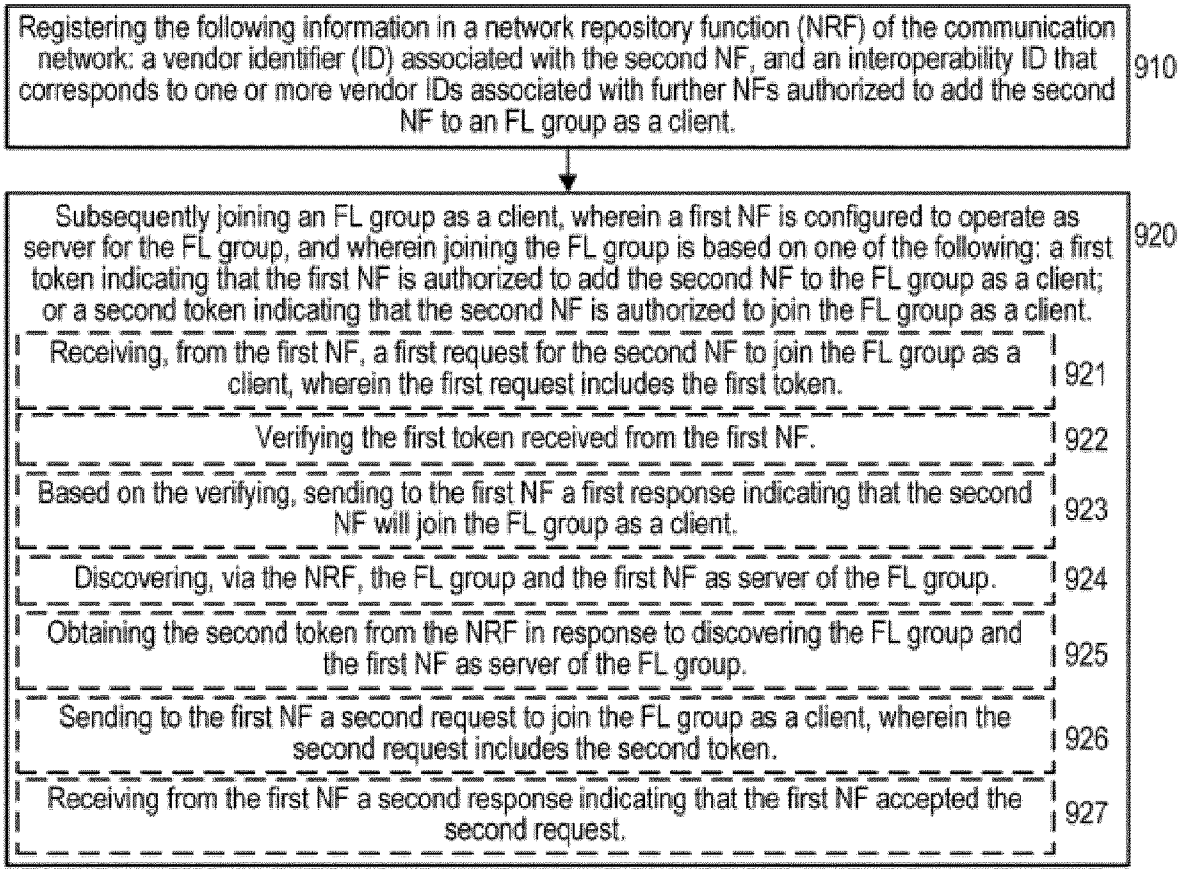
FIG. 9 shows an exemplary method (e.g., procedure) for a second NF of a communication network, according to various embodiments of the present disclosure.
Figure 10:
FIG. 10 shows an exemplary method (e.g., procedure) for an NRF of a communication network, according to various embodiments of the present disclosure.

These embodiments described above can be further illustrated with reference to FIGS. 8-10, which depict exemplary methods (e.g., procedures) for a first NF, a second NF, and an NRF, respectively. Put differently, various features of the operations described below correspond to various embodiments described above. The exemplary methods shown in FIGS. 8-10 can be used cooperatively (e.g., with each other and with other procedures described herein) to provide benefits, advantages, and/or solutions to problems described herein. Although the exemplary methods are illustrated in FIGS. 8-10 by specific blocks in particular orders, the operations corresponding to the blocks can be performed in different orders than shown and can be combined and/or divided into blocks and/or operations having different functionality than shown. Optional blocks and/or operations are indicated by dashed lines.

More specifically, FIG. 8 illustrates an exemplary method (e.g., procedure) for a first NF configured to operate as a server of a federated learning (FL) group in a communication network (e.g., 5GC), according to various embodiments of the present disclosure. The exemplary method shown in FIG. 8 can be performed by an FL server such as an NWDAF (or logical function thereof, such as MTLF) or a network node hosting an NWDAF, such as described elsewhere herein.

The exemplary method can include the operations of block 810, where the first NF can register the following information in a network repository function (NRF) of the communication network: a vendor identifier (ID) associated with the first NF, and an interoperability ID that corresponds to one or more vendor IDs associated with further NFs authorized to join the FL group as clients. The exemplary method can also include the operations of block 820, where the first NF can receive an indication of a second NF, of the communication network, that is a candidate client for the FL group. The exemplary method can also include the operations of block 830, where the first NF can create or update the FL group to include the second NF as a client, based on one of the following:

- a first token indicating that the first NF is authorized to add the second NF to the FL group as a client; or
- a second token indicating that the second NF is authorized to join the FL group as a client.

In some embodiments, the registered information also includes an analytics ID associated with a ML model used for FL, and the interoperability ID indicates authorization specific to the analytics ID.

In some embodiments, the registered information also includes one or more of the following:

- an indication of one or more FL capabilities associated with the first NF;
- a service area associated with the first NF;
- address information associated with the first NF; and
- an indication of authorization scope for the FL group, includes indications of one or more of the following criteria for NFs to join the FL group as clients: one or more allowed NF types, one or more allowed NF IDs, and one or more allowed FL capabilities.

In some embodiments, creating or updating the FL group including the second NF as a client in block 830 includes the following operations, labelled with corresponding sub-block numbers:

- (831) obtaining the first token from the NRF in response to the indication;
- (832) sending, to the second NF, a first request for the second NF to join the FL group as a client, wherein the first request includes the first token; and
- (833) receiving from the second NF a first response indicating that the second NF will join the FL group as a client.

In some of these embodiments, the first request is an FL preparation request message and the first response is an FL preparation response message.

In some of these embodiments, the indication of the second NF that is a candidate client is received from the NRF (e.g., in block 820) as one of the following: a response to a client discovery request by the first NF, or a notification responsive to a subscription request by the first NF to registering of information in the NRF by candidate clients for the FL group. In some variants of these embodiments, the client discovery request or the subscription request includes one or more of the following:

- the Vendor Id Associated With the First Nf,
- an analytics ID associated with a machine learning (ML) model used for FL, and
- an indication of one or more FL capabilities associated with the first NF.

In some variants of these embodiments, the indication from the NRF indicates a plurality of NFs that are candidate clients for the FL group, including the second NF, and a corresponding plurality of first tokens are obtained from the NRF and sent to the plurality of NFs in respective first requests.

In some of these embodiments, the indication of the second NF that is a candidate client (e.g., received in block 820) is based on one or more of the following that was registered in the NRF by the second NF: an interoperability ID that corresponds to one or more vendor IDs associated with further NFs authorized to add the second NF to an FL group as a client, and an analytics ID associated with a ML model used for FL.

In other embodiments, the indication of the second NF that is a candidate client is an FL join request message that is received from the second NF and that includes the second token. In such case, creating or updating the FL group including the second NF as a client in block 830 includes the operations of sub-block 834, where the first NF can verify the second token received from the second NF.

In some embodiments, creating or updating the FL group including the second NF as a client in block 830 includes the operations of sub-block 835, where the first NF can register one or more the following information with the NRF (i.e., after adding the second NF as client):

- an identifier of the FL group and/or of an FL procedure performed by the FL group; and
- an indication of authorization scope for the FL group, including indications of one or more of the following criteria for NFs to join the FL group as clients: one or more allowed NF types, one or more allowed NF IDs, and one or more allowed FL capabilities.

In some embodiments, the first NF is an NWDAF and/or the second NF is an NWDAF.

In addition, FIG. 9 illustrates an exemplary method (e.g., procedure) for a second NF configured to operate as a client of a FL group in a communication network (e.g., 5GC), according to various embodiments of the present disclosure. The exemplary method shown in FIG. 9 can be performed by an FL client such as an NWDAF (or logical function thereof, such as MTLF) or a network node hosting an NWDAF, such as described elsewhere herein.

The exemplary method can include the operations of block 910, where the second NF can register the following information in a network repository function (NRF) of the communication network: a vendor ID associated with the second NF, and an interoperability ID that corresponds to one or more vendor IDs associated with further NFs authorized to add the second NF to an FL group as a client. The exemplary method can also include the operations of block 920, where the second NF can subsequently join an FL group as a client. A first NF is configured to operate as server for the FL group, and joining the FL group is based on one of the following:

- a first token indicating that the first NF is authorized to add the second NF to the FL group as a client; or
- a second token indicating that the second NF is authorized to join the FL group as a client.

In some embodiments, the registered information also includes an analytics ID associated with a ML model used for FL, and the interoperability ID indicates authorization specific to the analytics ID. In some embodiments, the registered information also includes one or more of the following:

- an indication of one or more FL capabilities associated with the second NF;
- a service area associated with the second NF; and
- address information associated with the first NF.

In some embodiments, joining the FL group as a client in block 920 includes the following operations, labelled with corresponding sub-block numbers:

- (921) receiving, from the first NF, a first request for the second NF to join the FL group as a client, wherein the first request includes the first token;
- (922) verifying the first token received from the first NF; and
- (923) based on the verifying, sending to the first NF a first response indicating that the second NF will join the FL group as a client.

In some of these embodiments, the first request is an FL preparation request message and the first response is an FL preparation response message In other embodiments, joining the FL group as a client in block 920 includes the following operations, labelled with corresponding sub-block numbers:

- (924) discovering, via the NRF, the FL group and the first NF as server of the FL group;

(926) sending to the first NF a second request to join the FL group as a client, wherein the second request includes the second token; and (927) receiving from the first NF a second response indicating that the first NF accepted the second request.

In some of these embodiments, joining the FL group as a client in block 920 can also include the operations of sub-block 925, where the second NF can obtain the second token from the NRF in response to discovering the FL group and the first NF as server of the FL group (e.g., in block 924). The obtained second token is sent to the first NF with the second request (e.g., in sub-block 926).

In some of these embodiments, the second request is an FL join request message and the second response is an FL join request accepted message. In some of these embodiments, discovering the FL group and the first NF as server in sub-block 924 is based on one or more of the following that was registered in the NRF by the first NF:

- an identifier of the FL group and/or of an FL procedure performed by the FL group;
- an interoperability ID that corresponds to one or more vendor IDs associated with further NFs authorized to join the FL group as clients;
- an analytics ID associated with a machine learning (ML) model used for FL; and
- an indication of authorization scope for the FL group, including indications of one or more of the following criteria for NFs to join the FL group as clients: one or more allowed NF types, one or more allowed NF IDs, and one or more allowed FL capabilities.

In some embodiments, the first NF is an NWDAF and/or the second NF is an NWDAF.

In addition, FIG. 10 illustrates an exemplary method (e.g., procedure) for an NRF of a communication network (e.g., 5GC), according to various embodiments of the present disclosure. The exemplary method shown in FIG. 10 can be performed by an NRF or a network node hosting an NRF, such as described elsewhere herein.

The exemplary method can include the operations of block 1010, where the NRF can register the following information associated with first and second network functions (NFs) of the communication network:

- a first vendor identifier (ID) associated with the first NF configured to operate as a server for a federated learning (FL) group,
- a first interoperability ID that corresponds to one or more vendor IDs associated with further NFs authorized to join the FL group as clients,
- a second vendor ID associated with a second NF configured to operate as a FL client, and
- a second interoperability ID that corresponds to one or more vendor IDs associated with further NFs authorized to add the second NF to an FL group as a client.

The exemplary method can also include the operations of block 1060, where based on the registered information, the NRF can provide one or more of the following:

- to the first NF, a first token indicating that the first NF is authorized to add the second NF to the FL group as a client; or
- to the second NF, a second token indicating that the second NF is authorized to join the FL group as a client.

In some embodiments, the registered information also includes one or more of the following:

- a first analytics ID associated with a machine learning (ML) model used for FL by the first NF;
- a second analytics ID associated with a ML model used for FL by the second NF;

- an indication of one or more first FL capabilities associated with the first NF; and
- an indication of one or more second FL capabilities associated with the second NF.

In some of these embodiments, the registered information also includes one or more of the following:

- respective service areas associated with the first and second NFs;
- respective address information associated with the first and second NFs; and
- an indication of authorization scope for the FL group, includes indications of one or more of the following criteria for NFs to join the FL group as clients: one or more allowed NF types, one or more allowed NF IDs, and one or more allowed FL capabilities.

In some embodiments, the exemplary method can also include the operations of block 1020, where the NRF can discover the second NF based on one or more of the following matches or correspondences:

- a match between the second vendor ID and one of the vendor IDs that correspond to the first interoperability ID,
- a match between the first analytics ID and the second analytics ID, and
- a match or correspondence between the first capabilities and the second capabilities.

In such embodiments, the exemplary method can also include the operations of block 1030, where the NRF can send to the first NF an indication that the second NF is a candidate client for the FL group.

In some of these embodiments, discovering the second NF (e.g., in block 1020) and sending the indication (e.g., in block 1030) are responsive to one of the following: a client discovery request by the first NF, or a subscription request by the first NF to registering of information in the NRF by candidate clients for the FL group. In some variants of these embodiments, the client discovery request or the subscription request includes one or more of the following, upon which the matches or correspondences are based: the first vendor ID associated with the first NF, the first analytics ID, and the indication of the one or more FL capabilities associated with the first NF.

In some of these embodiments, providing the first token to the first NF (e.g., in block 1060) is responsive to a token request from the first NF, which is responsive to sending the indication that the second NF is a candidate client for the FL group (e.g., in block 1030).

In some of these embodiments, the second NF is one of a plurality of candidate clients for the FL group, the indication sent to the first NF (e.g., in block 1030) identifies the plurality of candidate clients, and a plurality of first tokens associated with respective candidate clients are provided to the first NF (e.g., in block 1060).

In other embodiments, the exemplary method can also include the operations of block 1040, where the NRF can discover the first NF based on one or more of the following matches or correspondences:

- a match between the first vendor ID and one of the vendor IDs that correspond to the second interoperability ID,
- a match between the first analytics ID and the second analytics ID, and
- a match or correspondence between the first capabilities and the second capabilities.

In such embodiments, the exemplary method can also include the operations of block 1050, where the NRF can send to the second NF an indication of the FL group and that the first NF is server for the FL group.

In some of these embodiments, discovering the first NF (e.g., in block 1040) and sending the indication (e.g., in block 1050) are responsive to one of the following: the registering of the information associated with the second NF, or a server discovery request by the second NF. In some variants of these embodiments, the server discovery request includes one or more of the following, upon which the matches or correspondences are based: the second vendor ID associated with the second NF, the second analytics ID, and the indication of the one or more FL capabilities associated with the second NF.

In some of these embodiments, providing the second token to the second NF (e.g., in block 1060) is responsive to a token request from the second NF, which is responsive to sending the indication of the FL group and that the first NF is server for the FL group (e.g., in block 1050).

In some embodiments, the first NF is an NWDAF and/or the second NF is an NWDAF.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 11:
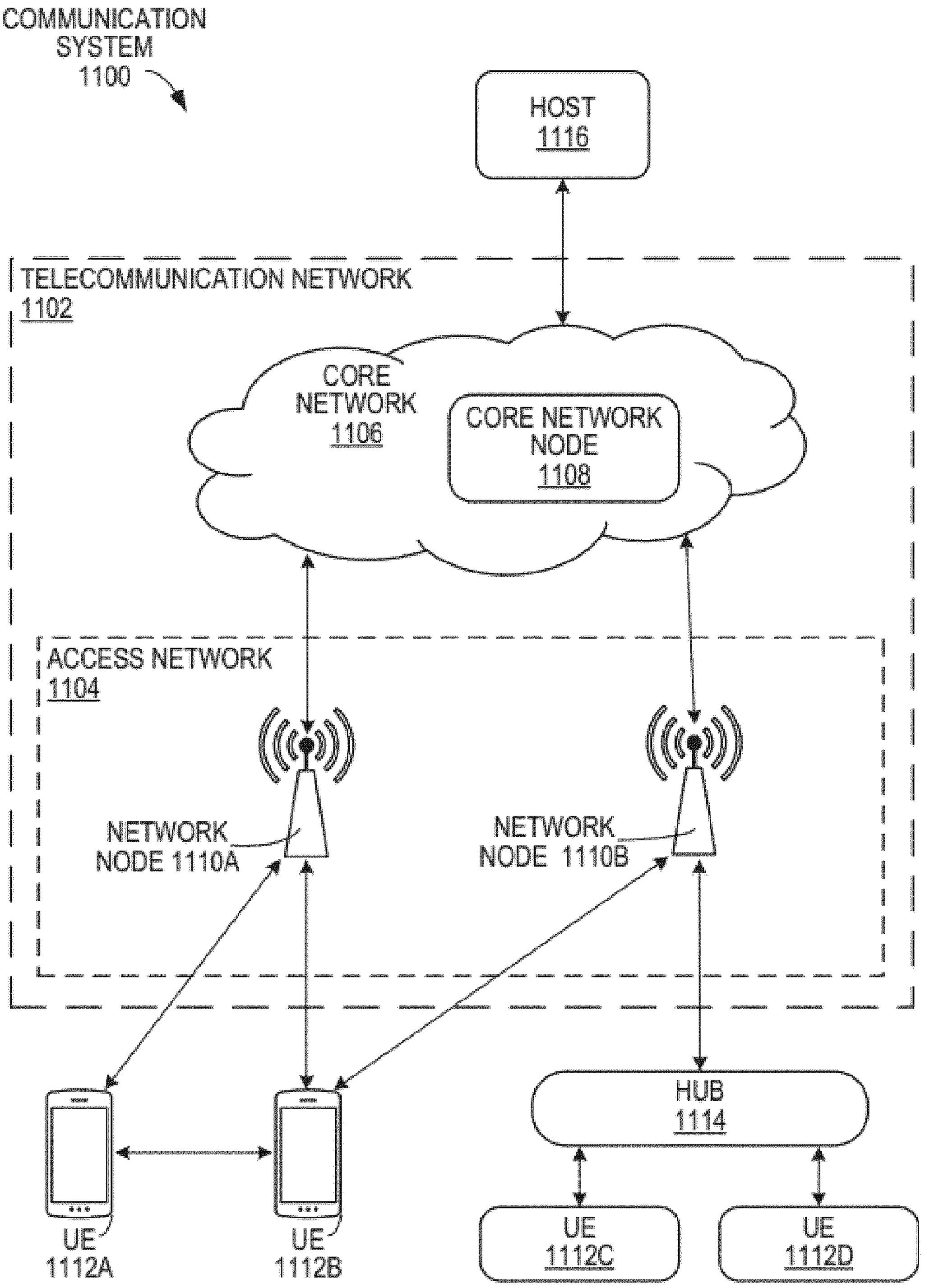
FIG. 11 shows a communication system according to various embodiments of the present disclosure.

FIG. 11 shows an example of a communication system 1100 in accordance with some embodiments. In this example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110*a* and 1110*b* (one or more of which may be generally referred to as network nodes 1110), or any other similar 3GPP access node or non-3GPP access point. The network nodes 1110 facilitate direct or indirect connection of UEs, such as by connecting UEs 1112*a-d* (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 12:
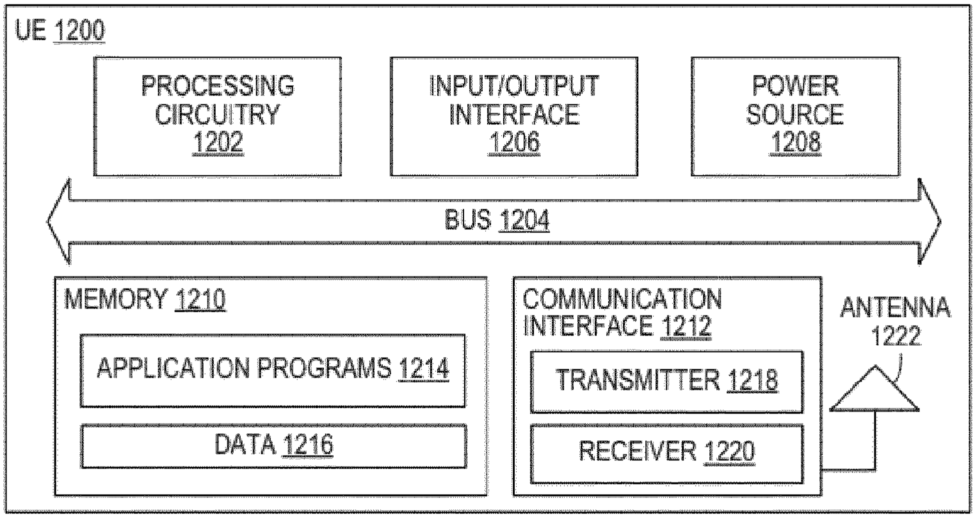
FIG. 12 shows a UE according to various embodiments of the present disclosure.

FIG. 12 shows a UE 1200 in accordance with some embodiments. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
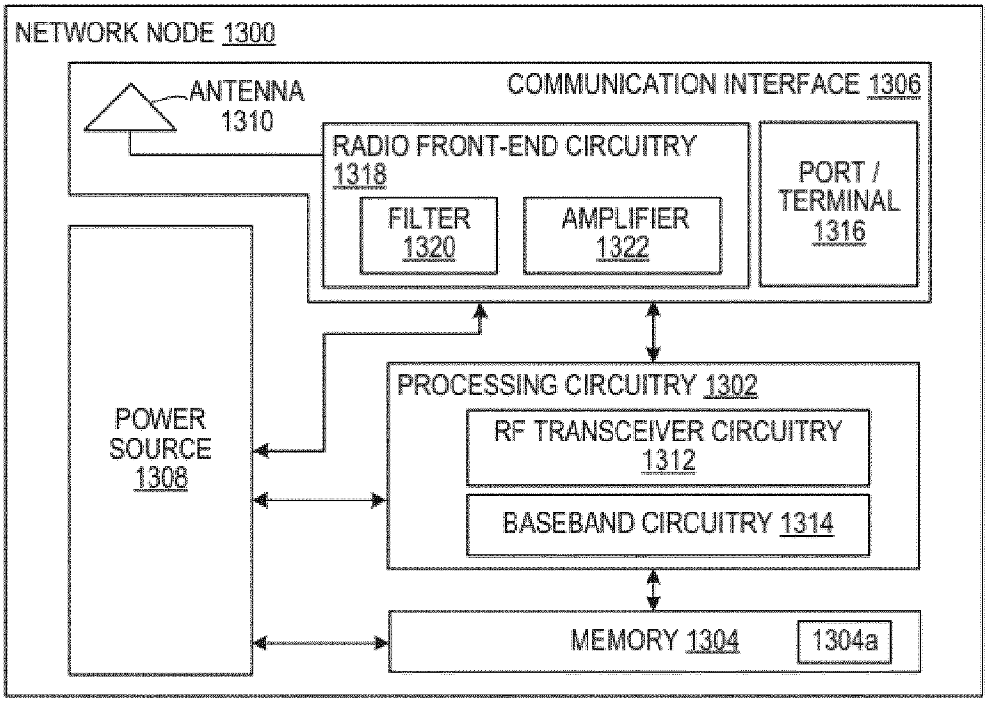
FIG. 13 shows a network node according to various embodiments of the present disclosure.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

For example, one or more network nodes 1300 can be configured to perform operations attributed to an FL server NF (e.g., server NWDAF), an FL client NF (e.g., client NWDAF), or an NRF in the descriptions herein of various methods or procedures.

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, RFID, or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions (collectively denoted computer program product 1304*a*) capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
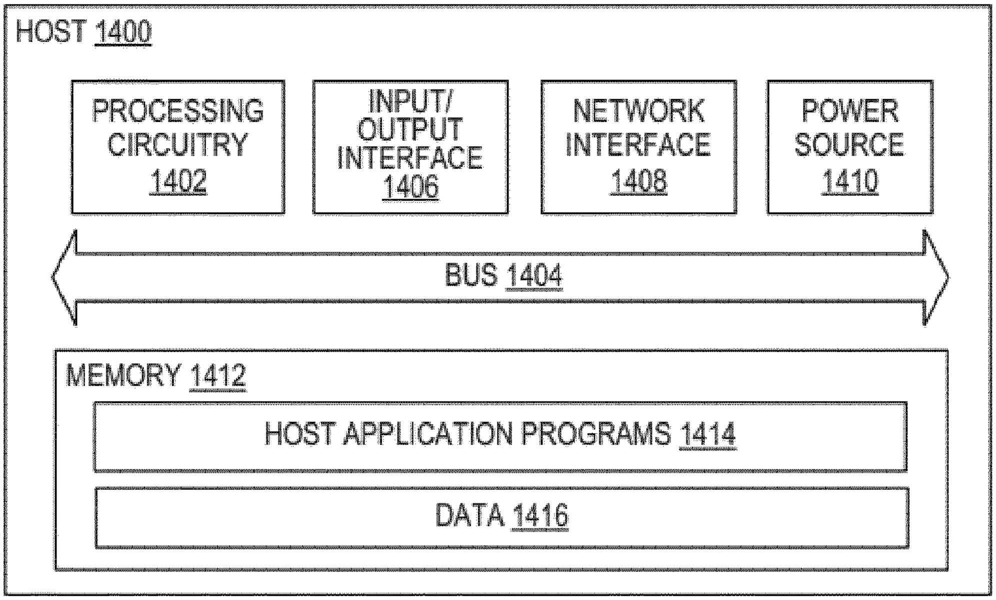
FIG. 14 shows host computing system according to various embodiments of the present disclosure.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
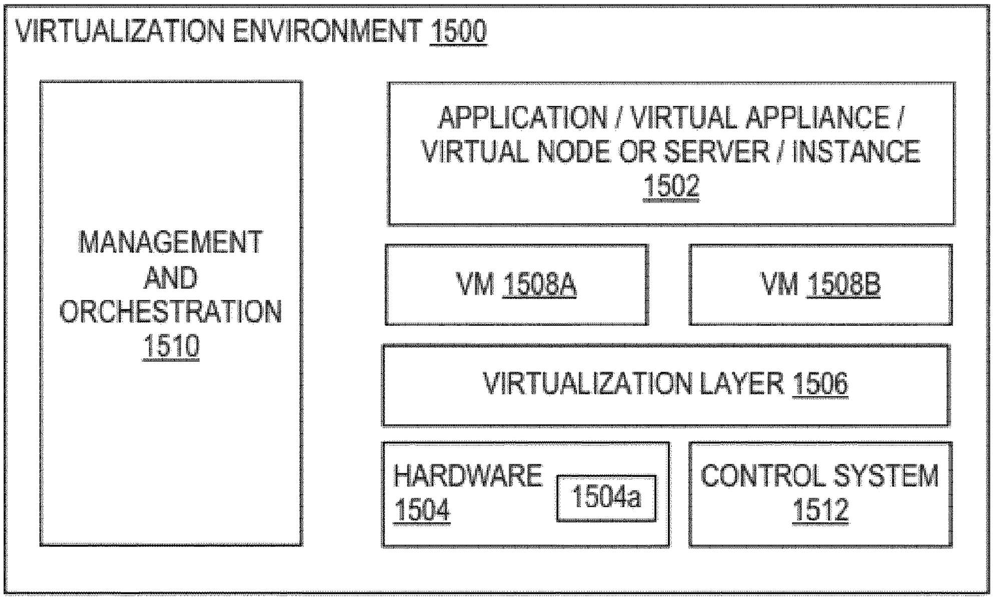
FIG. 15 is a block diagram of a virtualization environment in which functions implemented by some embodiments of the present disclosure may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

For example, various NFs (or portions thereof) described herein in relation to other figures can be implemented as virtual network functions 1502 in virtualization environment 1500. As a more specific example, an FL server NF (e.g., NWDAF), an FL client NF (e.g., NWDAF), and/or an NRF can be implemented as virtual network functions 1502 in virtualization environment 1500.

Hardware 1504 includes processing circuitry, memory that stores software and/or instructions (collectively denoted computer program product 1504*a*) executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508*a* and 1508*b* (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g. such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Figure 16:
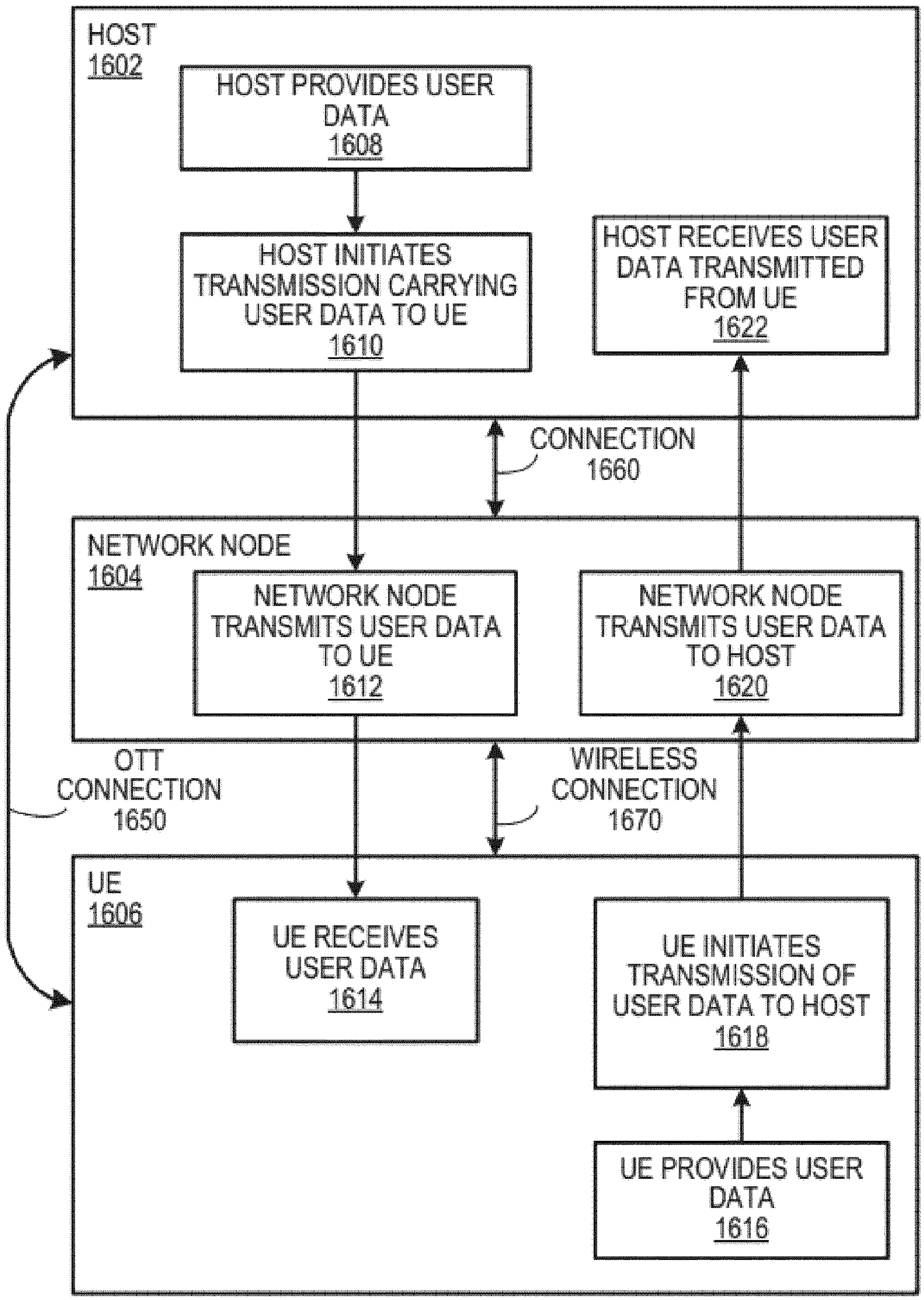
FIG. 16 illustrates communication between a host computing system, a network node, and a UE via multiple connections, according to various embodiments of the present disclosure.

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112*a* of FIG. 11 and/or UE 1200 of FIG. 12), network node (such as network node 1110*a* of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1606 using the OTT connection 1650, in which the wireless connection 1670 forms the last segment. More precisely, embodiments can prevent an unauthorized NF (e.g., NWDAF) from joining a FL group as a client and/or prevent a NF from joining a group as a client for FL operations that are fraudulent and/or non-authentic. In this manner, embodiments can prevent exposure of confidential and/or sensitive ML models to unauthorized parties during FL, and can mitigate security risks to NFs participating in FL. By improving security, embodiments facilitate deployment of FL in a multi-vendor communication network (e.g., 5GC), which can improve ML models used for network performance analytics in such networks. This can result in improved network performance, which increases the value of OTT services delivered over such improved networks to both end users and service providers.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above, or supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency and the like, by the host 1602. The measurements may be implemented in that software causes messages to be transmitted, in particular empty or 'dummy' messages, using the OTT connection 1650 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Example embodiments of the techniques and apparatus described herein include, but are not limited to, the following enumerated claims.

The invention claimed is:

1. A method for a first network function (NF) configured to operate as a server of a federated learning (FL) group in a communication network, the method comprising:

registering the following information in a network repository function (NRF) of the communication network: a vendor identifier (ID) associated with the first NF, and an interoperability ID that corresponds to one or more vendor IDs associated with further NFs authorized to join the FL group as clients;

receiving an indication of a second NF, of the communication network, that is a candidate client for the FL group; and creating or updating the FL group to include the second NF as a client, based on one of the following:

a first token indicating that the first NF is authorized to add the second NF to the FL group as a client; or a second token indicating that the second NF is authorized to join the FL group as a client.

2. The method of claim 1, wherein:

the registered information also includes an analytics ID associated with a machine learning (ML) model used for FL; and the interoperability ID indicates authorization specific to the analytics ID.

3. The method of claim 1, wherein the registered information also includes one or more of the following:

an indication of one or more FL capabilities associated with the first NF;

a service area associated with the first NF;

address information associated with the first NF; and an indication of authorization scope for the FL group, includes indications of one or more of the following criteria for NFs to join the FL group as clients: one or more allowed NF types, one or more allowed NF IDs, and one or more allowed FL capabilities.

4. The method of claim 1, wherein creating or updating the FL group to include the second NF as a client comprises:

obtaining the first token from the NRF in response to the indication;

sending to the second NF a first request for the second NF to join the FL group as a client, wherein the first request includes the first token; and receiving from the second NF a first response indicating that the second NF will join the FL group as a client.

5. The method of claim 4, wherein the first request is a FL preparation request message and the first response is a FL preparation response message.

6. The method of claim 4, wherein the indication of the second NF that is a candidate client is received from the NRF as one of the following:

a response to a client discovery request by the first NF; or a notification responsive to a subscription request by the first NF to registering of information in the NRF by candidate clients for the FL group.

7. The method of claim 6, wherein the client discovery request or the subscription request includes one or more of the following:

the vendor ID associated with the first NF, an analytics ID associated with a machine learning (ML) model used for FL, and an indication of one or more FL capabilities associated with the first NF.

8. The method of claim 7, wherein:

the indication from the NRF indicates a plurality of NFs that are candidate clients for the FL group, including the second NF; and a corresponding plurality of first tokens are obtained from the NRF and sent to the plurality of NFs in respective first requests.

9. The method of claim 4, wherein the indication of the second NF that is a candidate client is based on one or more of the following that was registered in the NRF by the second NF:

an interoperability ID that corresponds to one or more vendor IDs associated with further NFs authorized to add the second NF to a FL group as a client; and an analytics ID associated with a machine learning (ML) used for FL.

10. The method of claim 1, wherein:

the indication of the second NF that is a candidate client is a FL join request message that is received from the second NF and that includes the second token; and creating or updating the FL group to include the second NF as a client comprises verifying the second token received from the second NF.

11. The method of claim 1, wherein creating or updating the FL group to include the second NF as a client comprises registering one or more of the following information with the NRF:

an identifier of the FL group and/or of a FL procedure performed by the FL group; and an indication of authorization scope for the FL group, including indications of one or more of the following criteria for NFs to join the FL group as clients: one or more allowed NF types, one or more allowed NF IDs, and one or more allowed FL capabilities.

12. The method of claim 1, wherein one or more of the following applies: the first NF is a network data analytics function (NWDAF), and the second NF is an NWDAF.

13. A method for a second network function (NF) configured to operate as a client of federated learning (FL) groups in a communication network, the method comprising:

registering the following information in a network repository function (NRF) of the communication network: a vendor identifier (ID) associated with the second NF, and an interoperability ID that corresponds to one or more vendor IDs associated with further NFs authorized to add the second NF to FL groups as a client; and subsequently joining a FL group as a client, based on one of the following:

a first token indicating that a first NF, configured to operate as a server for the FL group, is authorized to add the second NF to the FL group as a client; or a second token indicating that the second NF is authorized to join the FL group as a client.

14. The method of claim 13, wherein:

the registered information also includes an analytics ID associated with a machine learning (ML) model used for FL; and the interoperability ID indicates authorization specific to the analytics ID.

15. The method of claim 13, wherein the registered information also includes one or more of the following:

an indication of one or more FL capabilities associated with the second NF;

a service area associated with the second NF; and address information associated with the second NF.

16. The method of claim 13, wherein joining the FL group as a client comprises:

receiving from the first NF a first request for the second NF to join the FL group as a client, wherein the first request includes the first token;

verifying the first token received from the first NF; and based on the verifying, sending to the first NF a first response indicating that the second NF will join the FL group as a client.

17. The method of claim 16, wherein the first request is a FL preparation request message and the first response is a FL preparation response message.

18. The method of claim 13, wherein joining the FL group as a client comprises:

discovering, via the NRF, the FL group and the first NF as the server of the FL group;

sending to the first NF a second request to join the FL group as a client, wherein the second request includes the second token; and receiving from the first NF a second response indicating that the first NF accepted the second request.

19. The method of claim 18, wherein joining the FL group as a client further comprises obtaining the second token from the NRF in response to discovering the FL group and the first NF as the server of the FL group, wherein the obtained second token is sent to the first NF with the second request.

20. The method of claim 18, wherein the second request is a FL join request message and the second response is a FL join request accepted message.

21. The method of claim 18, wherein discovering the FL group and the first NF as the server of the FL group is based on one or more of the following that was registered in the NRF by the first NF:

an identifier of the FL group and/or of a FL procedure performed by the FL group;

an interoperability ID that corresponds to one or more vendor IDs associated with further NFs authorized to join the FL group as clients;

an analytics ID associated with a machine learning (ML) model used for FL; and an indication of authorization scope for the FL group, including indications of one or more of the following criteria for NFs to join the FL group as clients: one or more allowed NF types, one or more allowed NF IDs, and one or more allowed FL capabilities.

22. The method of claim 13, wherein one or more of the following applies: the first NF is a network data analytics function (NWDAF), and the second NF is an NWDAF.

23. Network equipment arranged to implement a first network function (NF) configured to operate as a server of a federated learning (FL) group in a communication network, the network equipment comprising:

communication interface circuitry arranged to communicate with other NFs of the communication network; and processing circuitry operably coupled to the communication interface circuitry, wherein the processing circuitry and the communication interface circuitry are configured to:

register the following information in a network repository function (NRF) of the communication network: a vendor identifier (ID) associated with the first NF, and an interoperability ID that corresponds to one or more vendor IDs associated with further NFs authorized to join the FL group as clients;

receive an indication of a second NF, of the communication network, that is a candidate client for the FL group; and create or update the FL group to include the second NF as a client, based on one of the following:

a first token indicating that the first NF is authorized to add the second NF to the FL group as a client; or a second token indicating that the second NF is authorized to join the FL group as a client.

24. Network equipment arranged to implement a second network function (NF) configured to operate as a client of a federated learning (FL) group in a communication network, the network equipment comprising:

communication interface circuitry configured to communicate with other NFs of the communication network; and processing circuitry operably coupled to the communication interface circuitry, wherein the processing circuitry and the communication interface circuitry are configured to perform the method of claim 13.

* * * * *